C. F. EATON.
WELT MACHINE.
APPLICATION FILED OCT. 1, 1917.
1,314,792.
Patented Sept. 2, 1919.
6 SHEETS—SHEET 1.
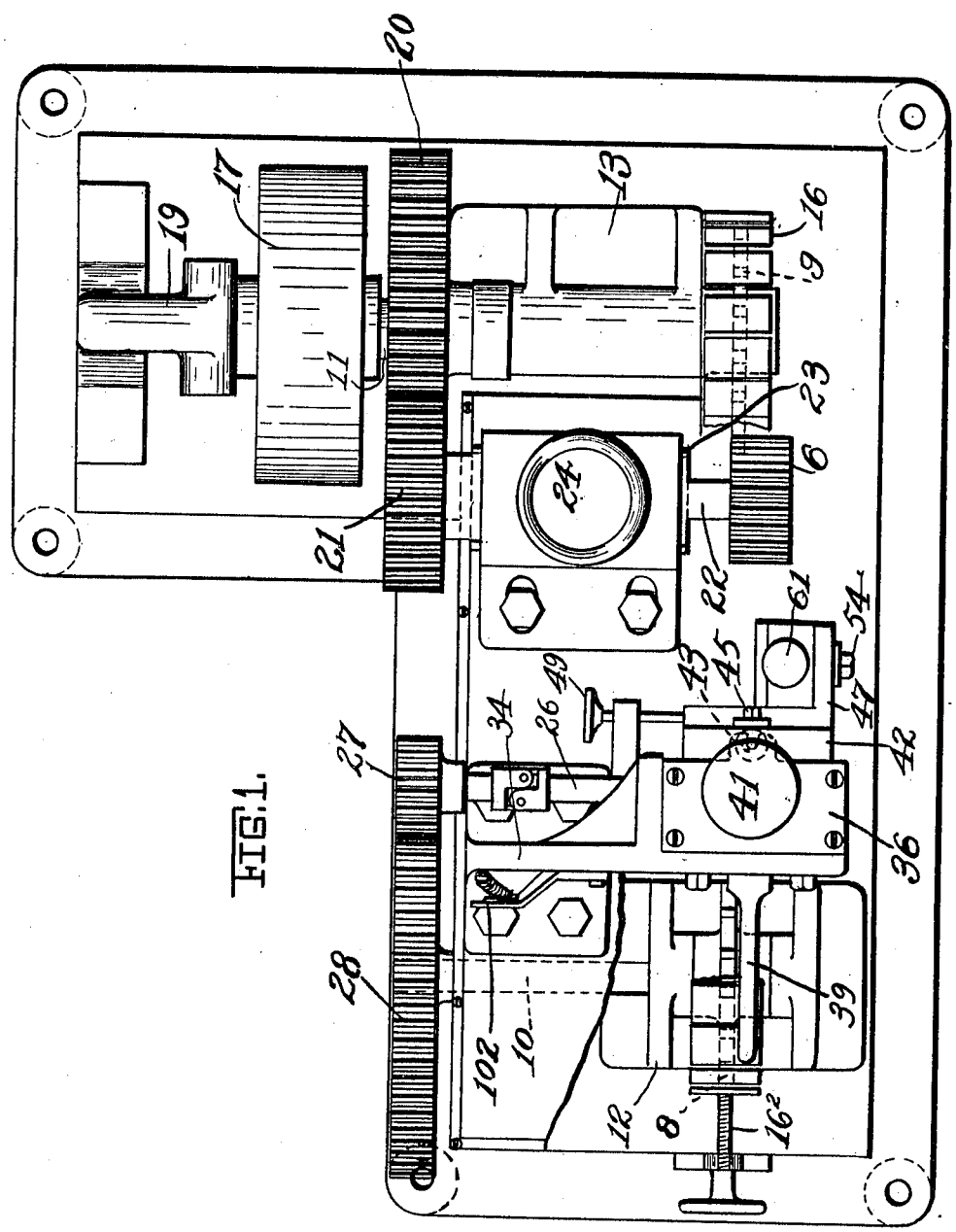
Inventor
Charles F. Eaton
By
Attorney C. F. EATON.
WELT MACHINE.
APPLICATION FILED OCT. 1, 1917.
1,314,792.
Patented Sept. 2, 1919.
6 SHEETS—SHEET 2.
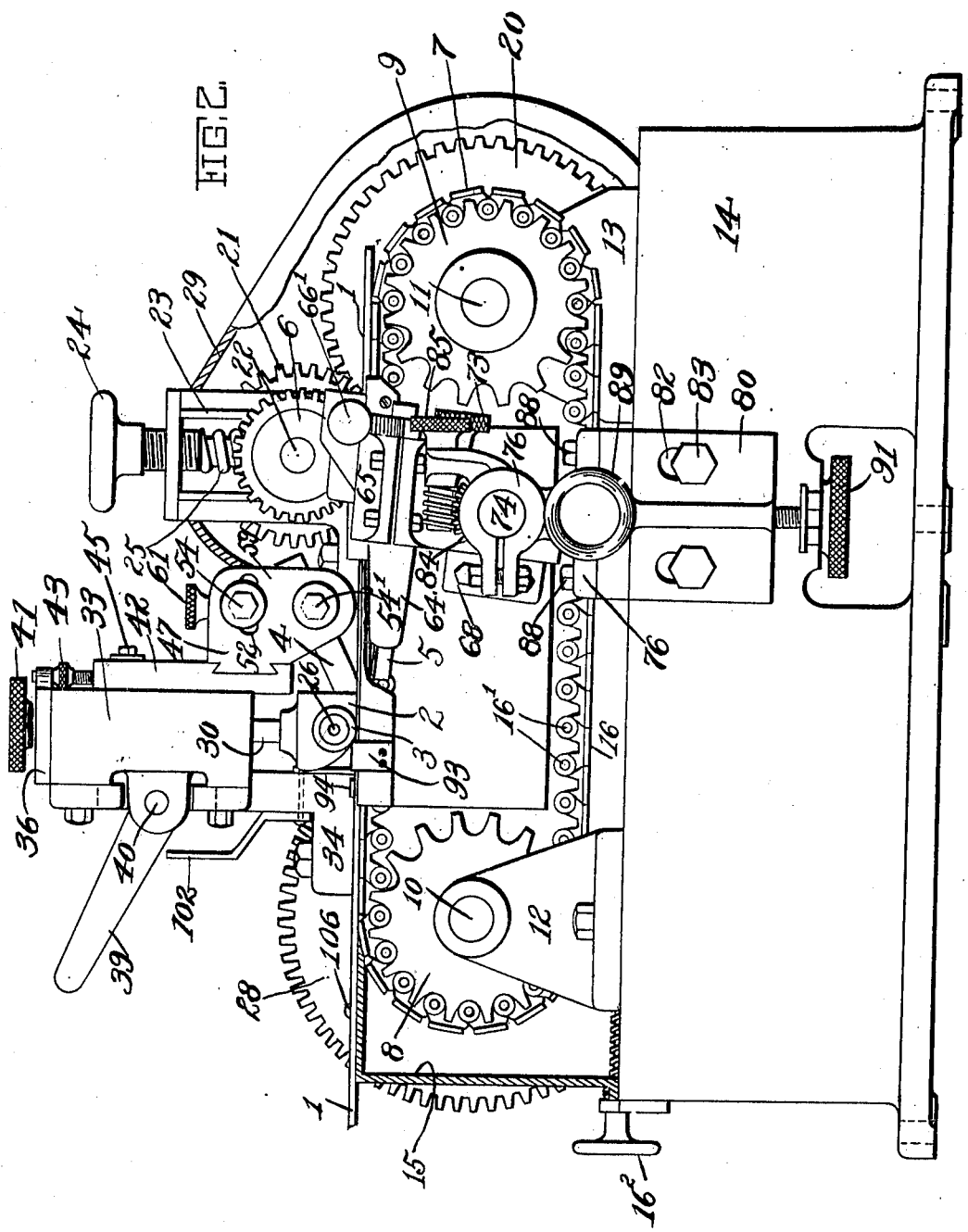
Inventor
Charles F. Eaton
By [signature]
Attorney

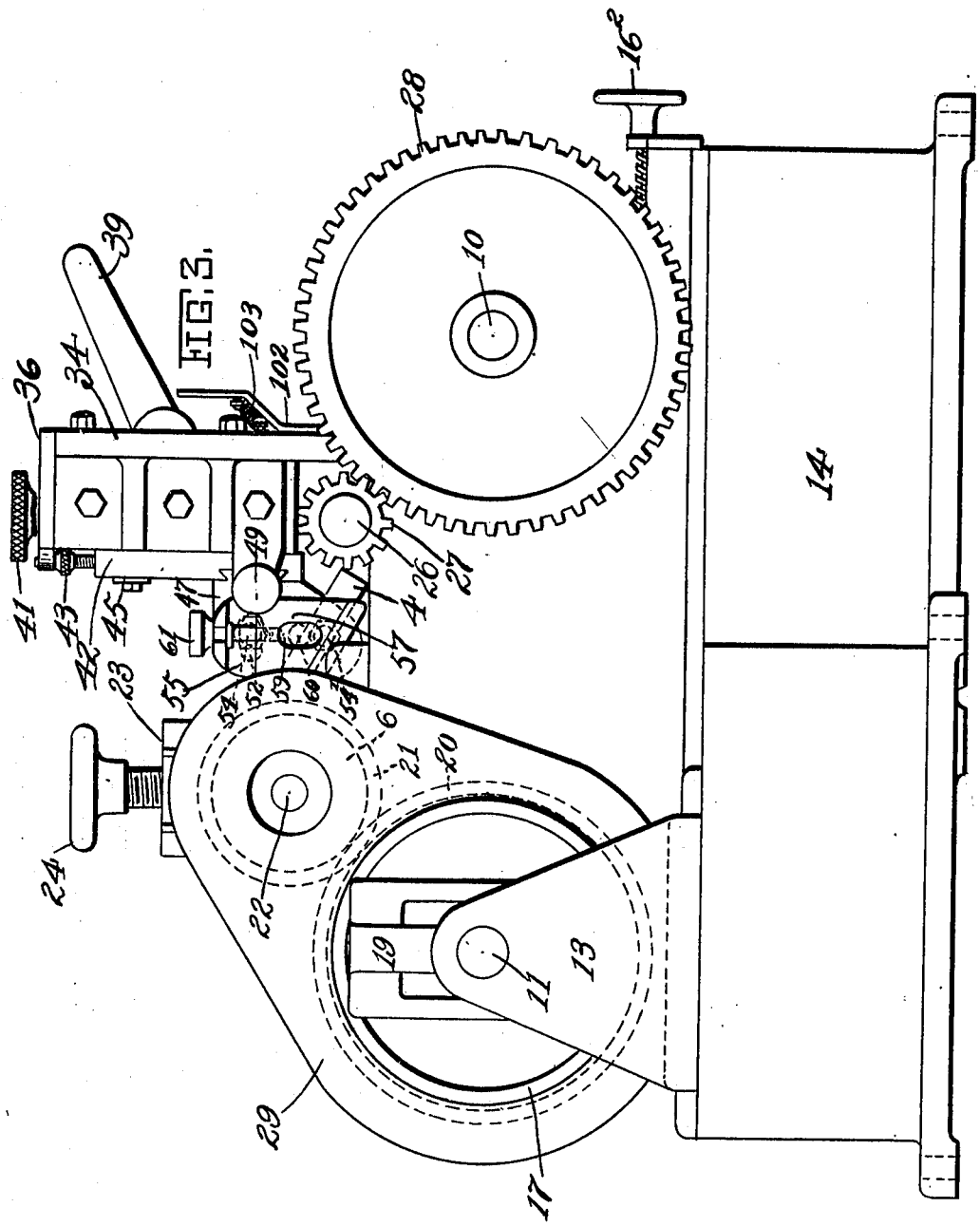

C. F. EATON.
WELT MACHINE.
APPLICATION FILED OCT. 1, 1917.
1,314,792.
Patented Sept. 2, 1919.
6 SHEETS—SHEET 4.
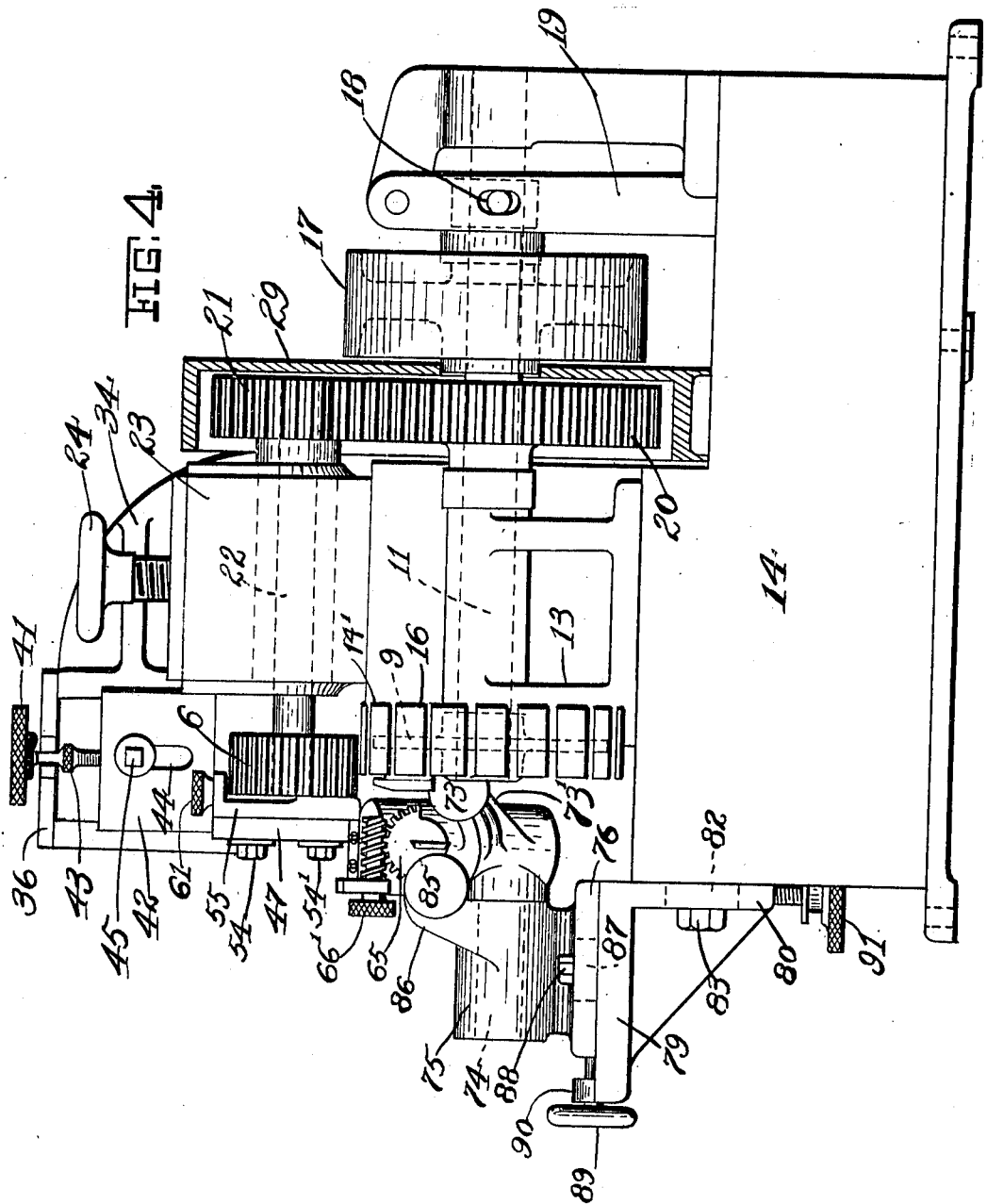
Inventor
Charles F. Eaton
By
Attorney

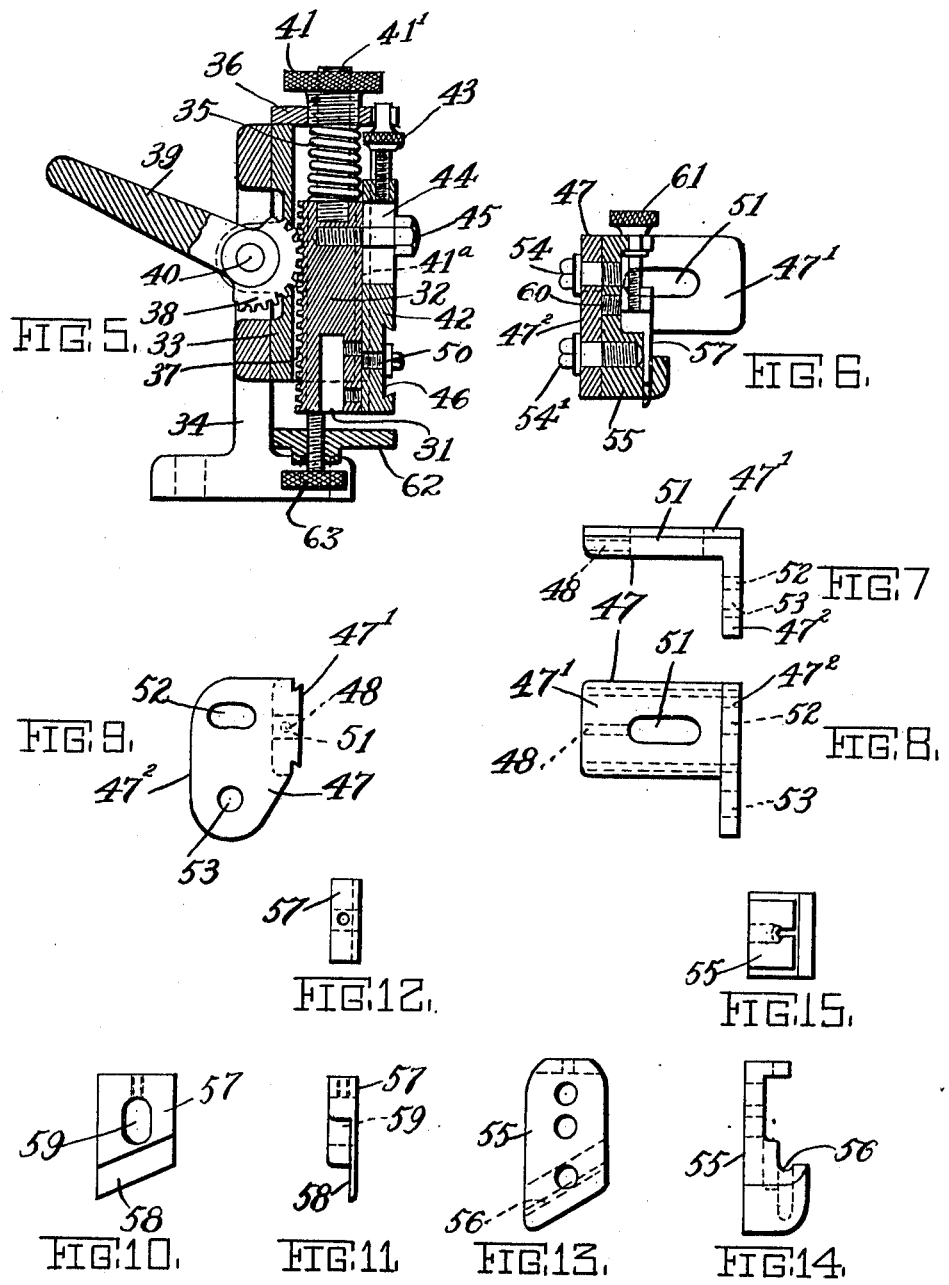

C. F. EATON.
WELT MACHINE.
APPLICATION FILED OCT. 1, 1917.
1,314,792.
Patented Sept. 2, 1919.
6 SHEETS—SHEET 6.
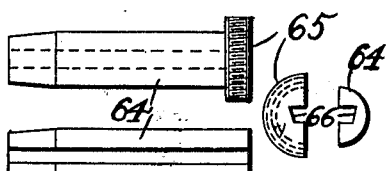
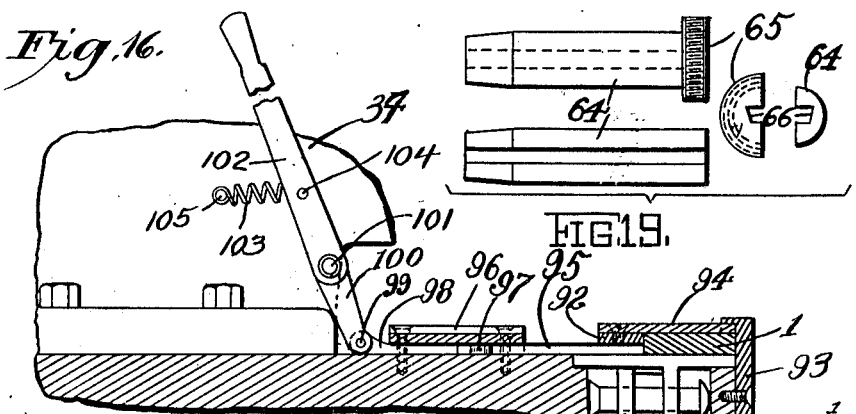
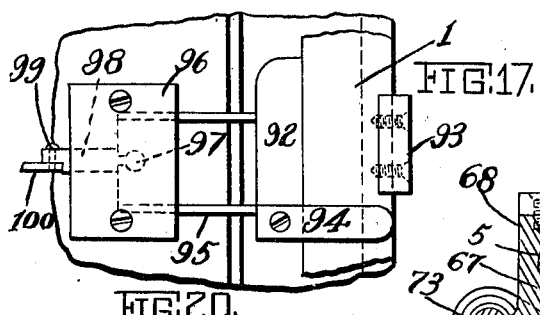
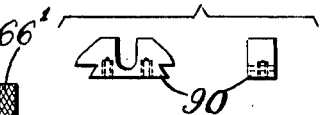
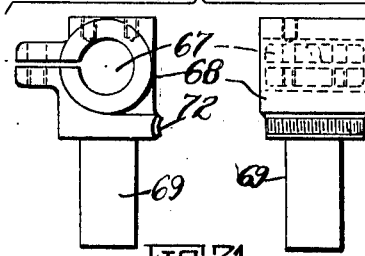
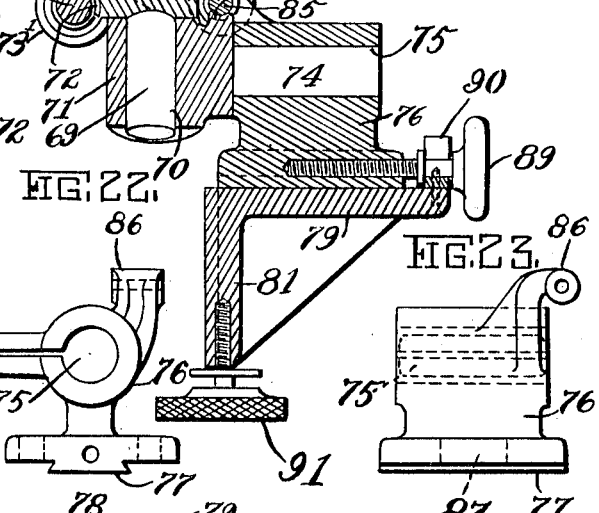
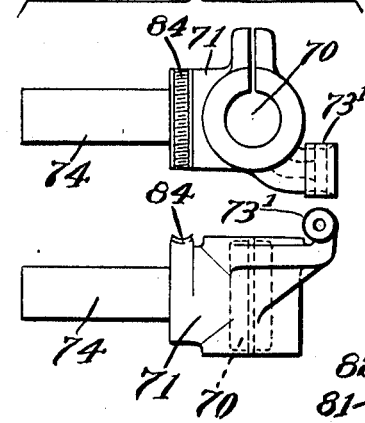
Inventor
Charles F. Eaton
By Ellis Spear Jr.
Attorney

UNITED STATES PATENT OFFICE.

CHARLES F. EATON, OF MANCHESTER, NEW HAMPSHIRE, ASSIGNOR TO W. H. McELWAIN COMPANY, OF BOSTON, MASSACHUSETTS, A CORPORATION OF MASSACHUSETTS.

WELT-MACHINE.

1,314,792. Specification of Letters Patent. Patented Sept. 2, 1919.

Application filed October 1, 1917. Serial No. 194,125.

*To all whom it may concern:*

Be it known that I, CHARLES F. EATON, a citizen of the United States, residing at Manchester, county of Hillsboro, State of New Hampshire, have invented certain new and useful Improvements in Welt-Machines, of which the following is a specification.

This invention relates to machines for preparing welts for use in the manufacture of welted shoes, and particularly to a machine adapted to cut a groove in the surface of the welt strip to receive the line of stitches which attaches the welt to the lasted insole and upper and to bevel one edge of the welt strip so that it will lie smoothly against the upper when it is sewn in place.

In welt preparing machines, it is usually necessary when a fresh roll of welting is to be prepared, to leave in front of the knives a length of welt, varying from a few inches to a foot or more, which is gripped and pulled through the machine in order that the remainder of the strip may be fed past the knives.

Various expedients have been devised to avoid the necessity of wasting these several inches of stock so that the machine will groove and bevel from start to finish, *i. e.*, the entire length of the strip, thus saving the forward end of the strip, but for the most part they have involved a loss of time and require the operator to make extra motions.

The machine of the present invention grooves and bevels from start to finish, but is so constructed and arranged as to avoid the necessity of reversing the direction of feed of the welt. This is accomplished through the use of a rotating endless conveyer or tractor operating in conjunction with a feed roll journaled above the welt supporting surface of the conveyer, and with the grooving and beveling knives which act respectively upon the upper and lower faces of the welt strip.

Another advantage of this tractor feed is that it prevents the bed plate of the machine from being grooved by the grooving knife acting on the welt, as happened in previous machines, and avoids the use of the special wear plates employed in such machines, and which required frequent replacement to take care of the wear.

Another feature of the present invention consists in the provision for preparing the welt uniformly throughout its entire length, regardless of variations in either thickness or surface hardness of the welt. The welt strip stock varies throughout its length, both as to thickness and as to degree of hardness or softness.

In such prior machines as have been devised, the welt strip has usually been held down upon the rigid supporting table under spring pressure, either by a vertically adjustable spring tensioned feed roll or by a vertically adjustable spring tensioned presser foot, so that the stock is squeezed and therefore cannot be cut through to advantage, especially on light welting, or if too much compressed is cut too deep. The squeezing action of the presser foot moreover has the tendency of breaking the stock at the lap joints. By reason of the extended surface of my traveling table I am able to run under a very light pressure and the presser foot, although spring tensioned, is prevented from squeezing contact with the upper face of the welting by an adjustable stop screw, which assures a light over-head bearing on the welt strip while it is fed through the machine.

A further feature of the present invention consists in the adjustments for the grooving and beveling knives whereby the machine is enabled to prepare the various types of welt strip used.

These several types are characterized by certain differences in the location or shape of the groove or bevel. It is possible to produce any and all of these several types of welting in the present machine by reason of the capacity for adjustment which the grooving and beveling knives have.

Moreover, my invention makes possible a machine of unusually light and compact construction, occupying but little floor space, and requiring the services of but one operative as against two which constitute the complement of the usual machines.

These and various other features which will appear more fully hereinafter are secured in the machine of the present invention the construction and operation of which together with a preferred embodiment thereof, is fully disclosed in the specification which follows, illustrated in the accompanying drawings, and particularly pointed out in the appended claims. Throughout the specification and drawings like reference characters are correspondingly employed, and in the drawings:—

Figure 1 is a partial plan view of a welt preparing machine in accordance with my invention.

Fig. 2 is a side elevation thereof, partly in section.

Fig. 3 is an elevation from the opposite side of the machine.

Fig. 4 is a rear elevation thereof.

Fig. 5 is a detail section of a presser foot and shows the vertically adjustable bracket for the grooving knife.

Fig. 6 is a detail section through the grooving knife holder, particularly illustrating its mounting on the horizontally adjustable grooving knife bracket.

Figs. 7, 8 and 9 are detail elevations of the horizontally adjustable grooving knife bracket, removed.

Figs. 10, 11 and 12 are detail elevations of the grooving knife clamp, removed.

Figs. 13, 14 and 15 are detail elevations of the grooving knife holder, removed.

Fig. 16 is a detail view, partly in section, of the automatically yieldable edge gage.

Fig. 17 is a partial plan view thereof.

Fig. 18 is a detail assembly section of the beveling knife and the means for adjusting said knife.

Fig. 19 illustrates in detail the holder for the beveling knife.

Fig. 20 illustrates in detail the horizontal swivel bracket for the beveling knife.

Fig. 21 illustrates in detail the vertical swivel bracket for the beveling knife.

Figs. 22 and 23 are detail elevations of the horizontally adjustable bracket for the beveling knife.

Fig. 24 illustrates in detail the holder for the adjustment screw for said bracket.

Fig. 25 is a detail elevation of the vertically adjustable bracket for the beveling knife.

I have indicated at 1 a strip of welting of characteristic quality, at 2 the presser foot, at 3 the feed roll carried by said presser foot, at 4 the adjustable grooving knife, at 5 the adjustable beveling knife, both of which knives are mounted to operate upon opposite faces of the welt in rear of the presser foot, at 6 a drag roll operating upon the upper face of the welt strip behind the feed roll 3, and at 16 a movable platform or table in the form of an endless conveyer supporting the welt strip from below. The tractor 16 operates over sprockets 8 and 9 mounted on shafts 10 and 11 extending transversely of the machine and journaled in suitable bearings 12 and 13 located at the feeding and reeling ends of the machine, respectively, and secured to any suitable base 14 which may be provided with a housing 15 for the tractor, and with a channeled guide-way $14^1$ in which the tractor lies (see Figs. 4 and 16).

The tractor 16 may be of any desired construction, and as here shown is made up of male and female links pinned together and having sockets for small rollers $16^1$ which mesh with the teeth of the sprockets 8 and 9 and receive the driving impulse. The outer or effective faces of the chain links may be corrugated or otherwise roughened to insure proper traction on the welt strip, and a suitable tightening device $16^2$ may be provided to take up slack in the endless conveyer 16.

As here shown, the rear sprocket shaft 11 which is the power shaft of the machine, carries a pulley 17 (see Fig. 4) adapted to be belted to a power source, and is provided with any suitable clutch mechanism, a portion of which is indicated at 18, adapted to be shifted by means of the clutch lever 19 which may be operated by any suitable treadle or the like. Fast on the power shaft 11 is a drive gear 20 meshing with a pinion 21 on the shaft 22 of the drag roll 6. The bearing 23 for said shaft 22 may be in the form of a strap adjustable vertically by any suitable adjusting device, as the screw 24, against the action of a coiled spring 25 which normally holds the shaft in position. The drag roll 6 therefore yieldably engages the upper face of the welt and is capable of adjustment relative thereto.

The feed roll 3 is adapted to be driven at the same speed as the tractor 16 and drag roll 6. As here shown, the transversely extending shaft 26 on which said feed roll is mounted, and which shaft is flexible to permit the feed roll to follow the adjustments of the presser foot 2, is provided at its opposite end with a pinion 27 meshing with a gear 28 mounted on the forward sprocket shaft 10. The gears 27 and 28 as well as the gears 20 and 21 may be inclosed within suitable housings 29.

The presser foot 2 is mounted for vertical adjustment relative to the tractor 16. This foot 2 may be in the form of a hollow head inclosing the feed roll 3 and having a stem 30 adapted to be detachably secured in a socket 31 (see Fig. 5) formed in the lower end of a presser foot adjusting block 32. The block 32 is slidably mounted within a presser foot shell 33 which is bolted to a presser foot bracket 34 rising from the bed 15 of the machine.

The block 32 is adapted to be adjusted vertically against the action of a coil spring 35 confined between it and the cap plate 36 of the presser foot shell 33, and for this purpose may conveniently be formed on one vertical face with a longitudinal series of rack teeth 37 with which meshes a gear segment 38 formed on a presser foot adjusting lever 39 which is pivoted at 40 to the shell 33. The tension of the spring 35 may be varied by means of a screw 41 threaded on a stem $41^1$ extending through the cap 36 and fixed into the upper end of the block 32.

The opposite vertical face of the block 32 is provided with a slideway $41^a$ in which slides the vertically adjustable bracket 42 for the grooving knife 4. This bracket 42 is adapted to be adjusted vertically by means of a screw 43 to regulate the depth of the groove cut. The bracket 42 has a vertical slot 44 in which is disposed a screw 45 for locking the bracket to the block 32, so that the presser foot and knife may work together when desired, and is formed with a horizontal slideway 46 (see Fig. 5) in which is adapted to slide a horizontally adjustable bracket 47, illustrated in detail, Figs. 6 to 9 inclusive.

The bracket 47 has a horizontal portion $47^1$ formed to slidably fit the dove-tailed slideway 46 of the vertically adjustable bracket 42, and a vertical portion $47^2$. The horizontal portion $47^1$ is tapped longitudinally as indicated at 48 to receive a feed screw 49, see Fig. 3, by means of which the bracket 47 may be adjusted laterally along the slideway 46. This adjustment is held by a clamping screw 50 which works in an elongated slot 51 in said horizontal portion $47^1$. The vertical portion $47^2$ of the bracket 47 is provided with an elongated horizontal slot 52 and a circular hole 53. Set through the slot 52 and hole 53 are screws 54 and $54^1$ carrying the grooving knife holder 55 (Figs. 6, 13, 14, and 15), which, as clearly shown in said figures, has a downward inclined seat 56 for the grooving knife 4. The screws 54 and $54^1$ therefore attach the holder 55 to the bracket 47, and by reason of the slot 52 and hole 53 allow the holder swiveling movement about the lowermost screw $54^1$ as an axis to change the cutting angle of the knife edge. The knife 4 is clamped to its seat 56 by a clamp 57 (Figs. 6, 10, 11 and 12) which, as best illustrated in said figures, has a portion 58 complemental to the seat 56 and a vertical slot 59 through which passes a clamping screw 60, see Fig. 3, engaging the holder 55, the slot 59 being elongated to allow the clamp 57 to be adjusted vertically relative to the holder 55, this adjustment being effected by a vertically disposed adjustment screw 61 passing through a portion of the holder and engaging the clamp. (See Fig. 6).

The feed screw 43 and slot 44 therefore permit the grooving knife 4 to be adjusted vertically along the slideway $41^a$ independently of the adjustment of the presser foot to regulate the depth of groove cut; the feed screw 49 permits said knife to be adjusted laterally along the slideway 46 to position the groove toward and from the marginal edge of the welt, the clamping screw 50 holding said lateral adjustment; the slot 52 and hole 53 permit the knife to be turned about the lower screw $54^1$ as an axis to vary the angle of presentation of the cutting edge to the welt; the screws 54 and $54^1$ holding said angular adjustment; and the screw 45 permits the knife to be locked to the presser foot so that both move together, this adjustment being especially used for grooving from the top down.

In addition to these adjustments, I also provide an adjustment for preventing the presser foot from squeezing contact with the welt. For this purpose, the presser foot bracket 34 has secured to it a presser foot stop plate 62 through which is set an adjustable stop screw 63 against which the block 32 is adapted to contact. The screw 63 when properly adjusted will thus prevent squeezing contact of the presser foot with the stock, relieving the stock of the pressure of the spring 35. This adjustment is particularly advantageous for light welting, where there is danger of cutting through the stock.

The beveling knife 5 operates upon the under face of the stock in rear of the point of operation of the grooving knife. This knife is capable of five adjustments; first, an adjustment for turning the knife angularly to vary the angle of cut for different kinds of bevels; second, a horizontal adjustment for moving the knife edge toward and from the marginal edge of the stock; third, a vertical adjustment for bringing the knife edge against the feedway which constitutes a gage in the cutting operation; fourth a horizontal adjustment of the carrier for the knife holder toward and from the stock to take off more or less stock; and fifth, a vertical adjustment of the carrier for the knife holder for cutting off more or less from the edge of the stock toward the top.

The first three adjustments are usually made in the order indicated, and the fourth and fifth adjustments are made after the first three adjustments are made, if necessary; the advantage being that the fourth and fifth adjustments permit the relation of the carrier for the knife holder to be varied without disturbing the previous adjustment of the knife itself made by the first three adjustments.

The bevel knife 5 fits in a socket 66 formed in a two-part cylindrical holder 64, see Fig. 19, one section of which is provided with a worm gear segment 65. The split holder 64 is clamped within the socket 67 of a horizontal swivel bracket 68 (Figs. 18 and 20), and is adapted to be adjusted to turn the knife angularly to vary the angle of cut for different kinds of bevels. This may be conveniently effected by means of an adjustment screw 66¹, see Fig. 2, having a worm thread engaging the worm gear segment 65 of the holder 64. The bracket 68 has a vertically depending swivel stud 69 adapted to fit in a socket 70 formed in a vertical swivel bracket 71, (Figs. 18 and 21) and has a worm gear segment 72 with which meshes the worm thread of an adjustment screw 73, which is adjustable in a bearing 73¹ formed on the vertical swivel bracket 71, said bracket 68 and screw 73 thus constituting means for adjusting the beveling knife horizontally toward and from the marginal edge of the stock.

The vertical swivel bracket 71 has a horizontally extending swivel stud 74 adapted to fit in a socket 75 formed in a horizontal adjustment bracket 76, which is formed at 77 for horizontal sliding travel in a slideway 78 formed in the upper horizontal portion 79 of a vertical adjustment bracket 80, the vertical portion 81 of which is slotted as indicated at 82 to recive clamping screws 83 fixed in the side wall of the base 14 and which screws 83 hold the adjustment of said bracket 80.

The vertical swivel bracket 71 has a worm gear segment 84 (Fig. 21) with which meshes the worm thread of an adjustment screw 85, (Fig. 4) which is adjustable in a bearing 86 formed on the horizontally adjustable bracket 76, said screw 85 and bracket 71 thus constituting means for adjusting the beveling knife vertically to bring the knife edge up against one edge of the feedway 14¹ whereby to gage the cutting operation.

The horizontal adjustment bracket 76 has a pair of elongated slots 87 in its horizontal face in which work clamping screws 88 carried by the horizontal portion 79 of the vertical adjustment bracket 80 whereby to hold the adjustment. Said bracket 76 is adjusted horizontally by an adjustment screw 89 which works in a holder 90, illustrated in detail Fig. 24, (see also Fig. 18), formed to fit the slideway 78 of the vertical adjustment bracket 80. The adjustment of the vertically adjustable bracket 80 is effected by means of an adjustment screw 91 engaged in a bore tapped in the vertical portion 81 of said bracket.

It will thus be seen that the three fine adjustments of the beveling knife may be effected by the respective screws 66¹, 73 and 85, and that the two rough adjustments may be effected by the respective screws 89 and 91. The advantage of this construction, furthermore, is that the screws 89 and 91 permit the relation of the carrier for the knife to be varied, both horizontally and vertically, without varying the previous fine adjustments of the knife itself which were effected by the screws 66¹, 73 and 85.

The welt strip is gaged for width by an automatic laterally yielding edge gage illustrated in detail, Figs. 16 and 17. This gage comprises a laterally movable blade 92 located in advance of the presser foot and adapted to abut one edge of the welt strip and with the coöperating fixed edge gage 93 define a channeled way through which travels the welt 1 supported on the feed chain 16.

The movable edge gage 92 may carry a finger 94 overlying the welt and assisting to prevent buckling thereof when the welt reaches the grooving and beveling knives. The movable gage 92 is carried by a sliding frame 95 operating in a way formed to receive it in a plate 96 secured to the upper face of the bed plate 15, and, as here shown, provided with a socket in which fits the head 97 of a link 98, pinned to which at 99 is one end of a rocker arm 100. The other end of said arm 100 is fastened to a pivot stud 101 set through the bracket 34 for the presser foot. Mounted on the pivot 101 is a hand lever 102 for adjusting the movable edge gage 92 through the described connections. The gage 92 is normally urged toward the fixed gage 93 by a coil spring 103 which is fastened at 104 to the lever 102 and at 105 to the bracket 34.

When it is desired to shift the movable edge gage 92, the lever 102 is rocked on its pivot against the action of the spring 103. In the operation of the gage, the blade 92 automatically accommodates itself to the variations in the thickness of the welt as it travels therepast, the spring 103 permitting the blade to yield laterally to follow these variations and at all times causing the blade to engage the welt with a tension sufficient to insure proper feeding.

The welt may be guided under any suitable loop 106 to straighten it and to prevent buckling before it passes to the gage, and after the grooving and beveling knives have operated upon it, may be coiled over the usual post or stake (not shown) as it runs from the tractor 16 until the entire reel or so much of it as it is desired to prepare has been prepared.

The "strings" cut by the grooving and beveling knives may be directed away from said knives into any suitable deposit receptacles. The operation is as follows:—

The welt is prepared by feeding it under the guiding devices 106 and 94 onto the endless conveyer 16 which with the feed roll 3 and drag roll 6 move it forward past the grooving and beveling knives, which have been previously adjusted to cut the desired groove and bevel, and finally passes off the tractor and may be coiled upon the stake. The stock is thus grooved from end to end, or expressed differently, from start to finish, without wastage, and without being squeezed. The several adjustments of the grooving knife and presser foot permit stock of varying thickness and surface hardness to be prepared into any of the several different types of welting commonly used, and permit the location and depth of the groove to be varied at will, while the several adjustments of the beveling knife similarly permit the location and angle of the bevel to be varied.

Various modifications in the form and construction of my invention may obviously be resorted to if within the limits of the appended claims.

What I therefore claim and desire to secure by Letters Patent is:

1. In a welt preparing machine, in combination, a welt preparing implement, and means for feeding the welt past said implement in a constant direction including a flexible endless conveyer constructed and arranged to present the welt in such manner to the implement that it is prepared continuously from end to end.

2. In a welt preparing machine, in combination, a welt preparing implement, and means for feeding the welt past said implement including a flexible endless conveyer constructed and arranged to present the welt in such manner to the implement that it is prepared continuously from end to end.

3. In a welt preparing machine, in combination, grooving and beveling knives, and means for feeding the welt in a constant direction past said knives including a flexible endless tractor supporting the welt from below and constructed and arranged to present the welt in such manner to the knives that it is prepared continuously from end to end.

4. In a welt preparing machine, in combination, a welt preparing implement, a feed roll and a flexible endless tractor engaging opposite faces of the welt for feeding the welt in a constant direction past said implement and constructed and arranged to present the welt in such manner to the implement that it is prepared continuously from end to end.

5. In a welt preparing machine, a welt preparing implement, a feed roll adapted to engage the upper face of the welt and feed the welt past said implement, and a flexible endless conveyer supporting the welt from below and constructed and arranged to present the welt in such manner to said implement that it is prepared continuously from end to end.

6. In a welt preparing machine, in combination, a welt preparing implement, and a flexible endless surface for supporting the welt relative to said implement and for feeding it past said implement constructed and arranged to present the welt to the implement in such manner that the implement may operate on the welt without wearing said surface.

7. In a welt preparing machine, in combination, a grooving knife implement, and a rotatable flexible endless surface for supporting the welt below said knife and for feeding it past said implement, constructed and arranged to present the welt to the implement in such manner that the knife may groove the welt without wearing said surface.

8. In a welt preparing machine, in combination, a grooving knife, and a flexible endless conveyer for supporting the welt below said knife and for feeding it past said knife and constructed and arranged to present the welt to the knife in such manner that the knife may groove the welt without wearing said conveyer.

9. In a welt preparing machine, in combination, a presser foot shell, a toothed block slidably mounted therein, a presser foot carried by said block, a lever pivotally mounted and having a gear segment adapted to mesh with the teeth of said toothed block, a spring backing said block, an adjustable stop for limiting the movement of said block in one direction to relieve the welt of the spring pressure on said presser foot, and a grooving knife carried by said block.

10. In a welt preparing machine, a presser foot, an adjustable carrier therefor, a bracket adjustable vertically of said carrier, a bracket adjustable horizontally of said vertically adjustable bracket, and a grooving knife holder swiveled to said horizontally adjustable bracket.

11. In a welt preparing machine, a presser foot, an adjustable carrier therefor, a bracket adjustable vertically of said carrier, a bracket adjustable horizontally of said vertically adjustable bracket, a grooving knife holder swiveled to said horizontally adjustable bracket, and a grooving knife adjustable longitudinally in said holder.

12. In a welt preparing machine, in combination, an adjustable block, a presser foot carried thereby, a bracket adjustable vertically of said block, means for permitting and holding said adjustment, a bracket adjustable horizontally of said vertically adjustable bracket, means for effecting said horizontal adjustment, and a grooving knife holder pivotally mounted upon said horizontally adjustable bracket.

13. In a welt preparing machine, in combination, an adjustable block having a slideway, a presser foot carried by said block, a bracket adjustable vertically in said slideway and having an elongated slot, a screw working in said slot adapted when tightened to lock said bracket to said block, a bracket adjustable horizontally on said vertically adjustable bracket, a screw for effecting said adjustment, means for holding said adjustment, and a grooving knife holder swiveled to said horizontally adjustable bracket.

14. In a welt preparing machine, in combination, an adjustable block having a vertically disposed slideway, a presser foot carried by said block, means for adjusting said block vertically, a vertically adjustable bracket slidable in said slideway and having an elongated vertical slot and a horizontally disposed slideway, a clamping screw in said slot permitting adjustment of the bracket relative to the block and adapted when tightened to clamp the bracket and block together for simultaneous movement, a horizontally adjustable bracket slidable in said horizontally disposed slideway, and having an elongated slot, a clamping screw in said elongated slot of the horizontally adjustable bracket permitting adjustment of said bracket in said horizontal slideway and adapted when tightened to clamp said bracket to said vertically adjustable bracket, and an adjustment screw for effecting said horizontal adjustment.

15. In a welt preparing machine, in combination, an adjustable block having a vertically disposed slideway, a presser foot carried by said block, means for adjusting said block vertically, a vertically adjustable bracket slidable in said slideway and having an elongated vertical slot and a horizontally disposed slideway, a clamping screw in said slot permitting adjustment of the bracket relative to the block and adapted when tightened to clamp the bracket and block together for simultaneous movement, a horizontally adjustable bracket consisting of a horizontal portion slidable in said horizontally disposed slideway, and having an elongated slot, and a vertical portion formed with an elongated slot, a clamping screw in the elongated slot of the horizontal portion permitting adjustment of said bracket in said horizontal slideway and adapted when tightened to clamp said bracket to said vertically adjustable bracket, an adjustment screw for effecting said horizontal adjustment, a knife holder pivoted to said vertical portion of the horizontally adjustable bracket, and a clamping screw in the elongated slot of said vertical portion for holding the adjustment of said knife holder relative to said horizontally adjustable bracket.

16. In a welt preparing machine, in combination, a vertically adjustable bracket having a horizontal slideway, a horizontally adjustable bracket slidable in said slideway and consisting of a horizontal portion and a vertical portion, said horizontal portion having an elongated slot, an adjustment screw for adjusting said horizontal bracket in said slideway, a clamping screw in said elongated slot for holding said horizontal adjustment, said vertical portion having an elongated slot, a knife carrier pivoted to said vertical portion and having a seat for a knife, a clamp screw in said elongated slot of the vertical portion engaging said carrier for holding the adjustment of said carrier relative to said horizontal bracket, and a knife clamp held to said carrier and adapted to adjustably clamp the knife to its seat.

17. In a welt preparing machine, in combination, a support, a vertical bracket swiveled thereto, a horizontal bracket swiveled to said vertical swivel bracket, and a beveling knife holder rotatably mounted upon said horizontal swivel bracket.

18. In a welt preparing machine, in combination, a vertically adjustable bracket, a bracket adjustable horizontally thereon, a vertical bracket swiveled to said horizontally adjustable bracket, a horizontal bracket swiveled to said vertical swivel bracket, and a beveling knife holder carried by said horizontal swivel bracket.

19. In a welt preparing machine, in combination, a vertically adjustable bracket, a horizontally adjustable bracket slidable thereon, a vertical swivel bracket swiveled to said horizontally adjustable bracket, a worm gear segment and screw for adjusting said vertical swivel bracket, a horizontal swivel bracket swiveled to said vertical swivel bracket, a worm gear segment and screw for adjusting said horizontal swivel bracket, and a beveling knife holder adjustably mounted on said horizontal swivel bracket.

20. In a welt preparing machine, in combination, an adjustable beveling knife holder, a horizontal swivel bracket carrying said holder and having a worm gear segment, means coöperating with said worm gear segment for adjusting said bracket, a vertical swivel bracket carrying said horizontal swivel bracket and having a worm gear segment, means coöperating with said worm for adjusting said vertical swivel bracket, a horizontally adjustable bracket carrying said vertical swivel bracket, means for adjusting said horizontally adjustable bracket, means for holding said horizontal adjustment, a vertically adjustable bracket carrying said horizontally adjustable bracket, means for adjusting said vertically adjustable bracket, and means for holding the adjustment of said vertically adjustable bracket.

21. In a welt preparing machine, in combination, a beveling knife holder having a worm gear segment, an adjustment screw coöperating with said worm gear segment to adjust the holder, a horizontal swivel bracket carrying said holder and having a worm gear segment, an adjustable screw cooperating with said worm gear segment for adjusting said bracket, a vertical swivel bracket carrying said horizontal swivel bracket and having a worm gear segment, an adjustment screw coöperating with said worm gear segment for adjusting said vertical swivel bracket, a horizontally adjustable bracket carrying said vertical swivel bracket, an adjustment screw for adjusting said horizontally adjustable bracket, a vertically adjustable bracket carrying said horizontally adjustable bracket, an adjustment screw for adjusting said vertically adjustable bracket, and clamping screws for respectively holding the adjustments of said horizontally and vertically adjustable brackets.

22. In a welt preparing machine, in combination, a beveling knife holder, a horizontal swivel bracket carrying said holder and having a worm gear segment, an adjustment screw coöperating with said worm gear segment for adjusting said bracket, a vertical swivel bracket carrying said horizontal swivel bracket and having a worm gear segment, a horizontally adjustable bracket carrying said vertical swivel bracket and having a bearing, an adjustment screw in said bearing coöperating with said worm gear segment for adjusting said vertical swivel bracket, and a vertically adjustable bracket carrying said horizontally adjustable bracket.

23. In a welt preparing machine, a knife holder having a worm gear segment, a bracket having a socket adapted to clamp said holder, and an adjustment screw having a worm thread adapted to engage said worm gear segment to vary the position of the knife in said holder.

24. In a welt preparing machine, a knife holder having a worm gear segment, an adjustment screw coöperative with said worm gear segment, a bracket having a socket adapted to clamp said holder, and having a swivel stud extending at right angles to said socket and a second bracket having a socket to receive said stud.

25. In a welt preparing machine, a knife holder having a worm gear segment, a bracket having a socket adapted to clamp said holder, and having a swivel stud extending at right angles to said socket, and a second bracket having a socket to receive said stud, and having a worm gear segment and an adjustment screw mounted in said second-named bracket and having a worm thread engaging the worm gear segment of the first-named bracket.

26. In a welt preparing machine, in combination, a welt preparing implement, a flexible endless conveyer constructed and arranged to present the welt in such manner to the implement that it is prepared from end to end, a drag roll, a drag roll shaft, a bearing for said shaft adjustable toward and from the conveyer, and a spring acting on said shaft to yieldingly maintain said drag roll in contact with the welt strip supported on said conveyer.

27. In a welt preparing machine, in combination, a welt preparing implement, a flexible endless conveyer constructed and arranged to present the welt in such manner to the implement that it is prepared from end to end, a drag roll, a drag roll shaft, a bearing for said shaft adjustable toward and from the conveyer, a screw for effecting said adjustment, and a spring acting on said shaft to yieldingly maintain said drag roll in contact with the welt strip supported on said conveyer.

28. In a welt preparing machine, in combination, a power shaft, and a pair of spaced tractor shafts, and a drag roll driven therefrom at substantially the same speed, and a flexible endless conveyer operating over said tractor shafts.

29. In a welt preparing machine, in combination, a power shaft, a pair of spaced tractor shafts, and a feed roll driven therefrom at substantially the same speed, and a flexible endless conveyer operating over said tractor shafts.

30. In a welt preparing machine, in combination, a power shaft, and a pair of spaced tractor shafts, a drag roll and a feed roll driven therefrom at substantially the same speed, and a flexible endless conveyer operating over said tractor shafts.

31. In a welt preparing machine, in combination, a pair of sprocket shafts, an endless conveyer driven therefrom, and a drag roll shaft and a feed roll shaft driven from said sprocket shafts.

32. In a welt preparing machine, in combination, a pair of sprocket shafts, an endless conveyer over said shafts, a drag roll shaft driven from one of said sprocket shafts, and a feed roll shaft driven from the other sprocket shaft.

33. In a welt preparing machine, in combination, a conveyer, a pair of sprocket shafts, a pulley on one of said shafts, a gear on said pulley shaft, a drag roll shaft, a pinion on said drag roll shaft meshing with the gear on the pulley shaft, a gear on the other sprocket shaft, a feed roll shaft, and a pinion on said feed roll shaft meshing with the gear on said other sprocket shaft.

34. In a welt preparing machine, in combination, an adjustable presser foot, and a feed roll shaft journaled in said presser foot and flexible to follow the adjustments of the presser foot.

35. In a welt preparing machine, in combination, an adjustable presser foot, and a feed roll carried thereby and following the adjustments of said foot.

36. In a welt preparing machine, in combination, a fixed edge gage, and a movable edge gage, a frame carrying said movable edge gage, a rocker connected to said frame, a lever connected to said rocker, and a spring against the tension of which said lever works and normally acting to yieldingly urge the movable edge gage against the welt.

37. In a welt preparing machine, in combination, a fixed edge gage and a movable edge gage, a frame carrying said movable edge gage, a plate having a way for said frame, a stem operatively connected with said frame, a rocker connected to said stem, a lever connected to said rocker, and a spring against the tension of which said lever works and normally acting to yieldingly urge the movable edge gage against the welt.

38. In a welt preparing machine, in combination, a fixed edge gage and a movable edge gage having a portion adapted to overlie the welt, a frame carrying said movable edge gage, a plate having a way for said frame, a stem having a head fitting a socket in said frame, a rocker connected to said stem, a lever connected to said rocker, and a spring against the tension of which said lever works and normally acting to yieldingly urge the movable edge gage against the welt.

39. In a welt preparing machine, a welt preparing implement, and a flexible endless conveyer constructed and arranged to present the welt to said implement in such manner that it is prepared from end to end.

40. In a welt preparing machine, a single set of grooving and beveling knives, and a flexible endless conveyer constructed and arranged to feed the welt continuously past said knives in a constant direction, whereby the welt is prepared continuously from end to end.

41. In a welt preparing machine, a single set of welt preparing implements, and a flexible endless conveyer constructed and arranged to feed the welt in a straight path past said implements whereby the welt is prepared continuously from end to end.

42. In a welt preparing machine, in combination, a welt preparing implement, a pair of spaced shafts, and a welt supporting surface rotatable around said shafts as axes for feeding the welt past said implement.

43. In a welt preparing machine, in combination, a welt preparing implement, a pair of spaced sprocket shafts, sprockets thereon, and a linked welt supporting surface operating over said sprockets for feeding the welt past said implement.

In testimony whereof I affix my signature in presence of two witnesses.

CHARLES F. EATON.

Witnesses:
EMERY M. FLANDERS,
PETER Y. MYHRE.

Copies of this patent may be obtained for five cents each, by addressing the "Commissioner of Patents, Washington, D. C."